United States Patent
Sakai (10) Patent No.: US 10,571,651 B2
(45) Date of Patent: Feb. 25, 2020

(54) IMAGE PICKUP OPTICAL SYSTEM, IMAGE PICKUP APPARATUS HAVING THE IMAGE PICKUP OPTICAL SYSTEM, LENS APPARATUS HAVING THE IMAGE PICKUP OPTICAL SYSTEM, AND IMAGE PICKUP SYSTEM HAVING THE IMAGE PICKUP OPTICAL SYSTEM

(71) Applicant: CANON KABUSHIKI KAISHA, Tokyo (JP)

(72) Inventor: Hideki Sakai, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/854,328

(22) Filed: Dec. 26, 2017

(65) Prior Publication Data

US 2018/0180843 A1 Jun. 28, 2018

(30) Foreign Application Priority Data

Dec. 27, 2016 (JP) ................. 2016-252695
Oct. 11, 2017 (JP) ................. 2017-197464

(51) Int. Cl.
*G02B 9/12* (2006.01)
*G02B 7/02* (2006.01)
(Continued)

(52) U.S. Cl.
CPC ............ *G02B 9/12* (2013.01); *G02B 7/021* (2013.01); *G02B 7/04* (2013.01); *G02B 9/64* (2013.01);
(Continued)

(58) Field of Classification Search
CPC ........ G02B 13/24; G02B 13/16; G02B 13/04; G02B 9/64; G02B 7/08; G02B 13/22; G02B 13/00; G02B 27/0025; G02B 9/34
See application file for complete search history.

(56) References Cited

U.S. PATENT DOCUMENTS

| 4,025,170 A | 5/1977 | Kawamura |
| 8,891,180 B2 | 11/2014 | Sakai |

(Continued)

FOREIGN PATENT DOCUMENTS

| JP | 2006201526 A | 8/2006 |
| JP | 2009-69414 A | 4/2009 |
| JP | 2011180225 A | 9/2011 |

OTHER PUBLICATIONS

European Search Report dated May 28, 2018 in corresponding European Patent Application No. 17205842.

(Continued)

*Primary Examiner* — Alicia M Harrington
(74) *Attorney, Agent, or Firm* — Carter, DeLuca & Farrell LLP (57) ABSTRACT

Provided is the image pickup optical system including a first lens unit, a second lens unit, and a third lens unit disposed in an order from an object side to an image side, in which an interval between adjacent lens units is changed during focusing. The third lens unit includes an aperture stop. A distance on an optical axis from a lens surface closest to object side to aperture stop when focused at infinity Lf, a distance on optical axis from aperture stop to a lens surface closest to image side when focused at infinity Lr, a distance on optical axis from a lens surface closest to object side to an image plane when focused at infinity L, a focal length of the entire system f, and a moving amount of first lens unit during focusing from infinity to a closest distance M are appropriately set.

22 Claims, 9 Drawing Sheets

(51) Int. Cl.
  *G02B 27/00*   (2006.01)
  *G02B 13/18*   (2006.01)
  *G02B 7/04*    (2006.01)
  *G02B 13/16*   (2006.01)
  *G02B 13/24*   (2006.01)
  *G02B 9/64*    (2006.01)
  *G02B 13/04*   (2006.01)
  *G02B 7/08*    (2006.01)

(52) U.S. Cl.
  CPC .............. *G02B 13/04* (2013.01); *G02B 13/16* (2013.01); *G02B 13/18* (2013.01); *G02B 13/24* (2013.01); *G02B 27/0025* (2013.01); *G02B 7/08* (2013.01)

(56) References Cited

U.S. PATENT DOCUMENTS

| | | |
|---|---|---|
| 9,201,225 B2 | 12/2015 | Sakai |
| 2007/0223114 A1 | 9/2007 | Yamamoto |
| 2009/0225437 A1* | 9/2009 | Mitsuki .............. G02B 27/0025 359/689 |
| 2011/0211263 A1 | 9/2011 | Sato et al. |
| 2016/0131878 A1 | 5/2016 | Nomura |

OTHER PUBLICATIONS

Japanese Office Action dated Oct. 16, 2018 in corresponding Japanese Patent Application No. 2017-197464, with English translation.

* cited by examiner

IMAGE PICKUP OPTICAL SYSTEM, IMAGE PICKUP APPARATUS HAVING THE IMAGE PICKUP OPTICAL SYSTEM, LENS APPARATUS HAVING THE IMAGE PICKUP OPTICAL SYSTEM, AND IMAGE PICKUP SYSTEM HAVING THE IMAGE PICKUP OPTICAL SYSTEM

BACKGROUND OF THE INVENTION

Field of the Invention

The present invention relates to an image pickup optical system, and is suitable to an image pickup apparatus such as a still camera, a video camera, a digital still camera, and a monitor camera.

Description of the Related Art

Conventionally, there is a demand for an image pickup optical system which is easy for a capture at a near distance where a capturing magnification is approximately equal magnification. In general, in most of image pickup optical systems, variations in various aberrations, for example, spherical aberration and field curvature, are increased as the capturing magnification increases, and an optical performance is lowered. Conventionally, there is known an image pickup optical system which employs a so-called floating method in which a plurality of lens units are individually moved during focusing to correct the variation of various aberrations during focusing (Japanese Patent Application Laid-Open No. 2009-69414). With the use of the floating method, a variation in aberrations is reduced during focusing from infinity to a close distance, and a good optical performance is easily obtained even in close-distance capturing.

Japanese Patent Application Laid-Open No. 2009-69414 discloses a retrofocus lens which is configured by a first lens unit having a negative refractive power, a second lens unit having a negative refractive power, and a third lens unit having a positive refractive power which are disposed in an order from an object side to an image side. In Japanese Patent Application Laid-Open No. 2009-69414, the respective lens units are moved toward the object side such that an interval between adjacent lens units is changed during focusing from infinity to a close distance. In particular, the entire system is moved toward the object side and the second lens unit is moved by a moving amount different from the other lens units at the time of close-distance capturing, so that the variation in aberration at the time of close-distance capturing is reduced.

In most of the image pickup optical systems, various aberrations such as the spherical aberration are increased in close-distance capturing. Therefore, the floating method in which two or more lens units are moved during focusing is significantly effective in reducing the variation in aberration in close-distance capturing.

However, it is important to use an appropriate floating method and to appropriately set the entire lens configuration in order to reduce the variation in aberration and to obtain a high optical performance in the entire object distance during focusing. If these configurations are not appropriately set, the entire system is increased in size, and the variation in various aberrations is increased during focusing. It is very difficult to obtain a high optical performance over the entire object distance and the entire screen.

In particular, it is important to appropriately arrange an aperture stop in order to easily perform the close-distance capturing while downsizing the entire lens system. For example, if a distance from a lens surface closest to the image side to the aperture stop is long in the close-distance capturing, there is a need to increase a barrel diameter between the lens and an image plane in order to secure a peripheral light amount in the close-distance capturing, which leads to an increase in outer diameter of the lens. In addition, if the distance from the lens surface closest to the object side to the aperture stop is short, it is difficult to dispose a cam barrel necessary to secure a feeding amount of the lens unit which performs focusing in the close-distance capturing.

SUMMARY OF THE INVENTION

An object of the invention is to provide an image pickup optical system which easily secures a sufficient feeding amount of a lens unit during focusing while sufficiently securing a peripheral light amount in close-distance capturing.

An image pickup optical system according to one aspect of the present invention includes a first lens unit, a second lens unit, and a third lens unit disposed in an order from an object side to an image side. An interval between adjacent lens units is changed during focusing. The third lens unit includes an aperture stop. The following conditional expressions are satisfied.

$$2.6 < Lf/Lr < 6.0,$$

$$2.5 < L/f < 5.0, \text{ and}$$

$$0.4 < |M/f| < 1.1.$$

Further, an image pickup optical system according to another aspect of the present invention includes a first lens unit and a second lens unit disposed in an order from an object side to an image side. An interval between adjacent lens units is changed during focusing. The third lens unit includes an aperture stop. The following conditional expressions are satisfied.

$$2.6 < Lf/Lr < 6.0,$$

$$2.5 < L/f < 5.0, \text{ and}$$

$$0.4 < |M/f| < 1.1.$$

Herein, Lf is a distance on an optical axis from a lens surface closest to the object side to the aperture stop in the image pickup optical system when the image pickup optical system is focused at infinity, Lr is a distance on the optical axis from the aperture stop to a lens surface closest to the image side in the image pickup optical system when the image pickup optical system is focused at infinity, L is a distance on the optical axis from a lens surface closest to the object side to an image plane when the image pickup optical system is focused at infinity, f is a focal length of the entire system, and M is a moving amount of the first lens unit during focusing from infinity to a closest distance.

An image pickup optical system according to another aspect of the present invention includes a first lens unit and a second lens unit disposed in an order from an object side to an image side. An interval between adjacent lens units is changed during focusing. The second lens unit includes an aperture stop. The following conditional expressions are satisfied.

$$2.6 < Lf/Lr < 6.0,$$

$$2.5 < L/f < 5.0, \text{ and}$$

$$0.4 < |M/f| < 1.1.$$

Herein, Lf is a distance on an optical axis from a lens surface closest to the object side to the aperture stop in the image pickup optical system when the image pickup optical system is focused at infinity, Lr is a distance on the optical axis from the aperture stop to a lens surface closest to the image side in the image pickup optical system when the image pickup optical system is focused at infinity, L is a distance on the optical axis from a lens surface closest to the object side to an image plane when the image pickup optical system is focused at infinity, f is a focal length of the entire system, and M is a moving amount of the first lens unit during focusing from infinity to a closest distance.

Further features of the present invention will become apparent from the following description of exemplary embodiments with reference to the attached drawings.

DESCRIPTION OF THE EMBODIMENTS

Hereinafter, preferred embodiments of the present invention will now be described in detail in accordance with the accompanying drawings. An image pickup optical system of the present invention is suitable to an image pickup apparatus such as a digital camera and a TV camera.

An image pickup optical system according to one aspect of the present invention is configured by a first lens unit, a second lens unit, and a third lens unit disposed in an order from an object side to an image side. An interval between the adjacent lens units is changed during focusing. An image pickup optical system according to another aspect of the present invention is configured by a first lens unit and a second lens unit disposed in an order from an object side to an image side. An interval between the adjacent lens units is changed during focusing.

Figure 1:
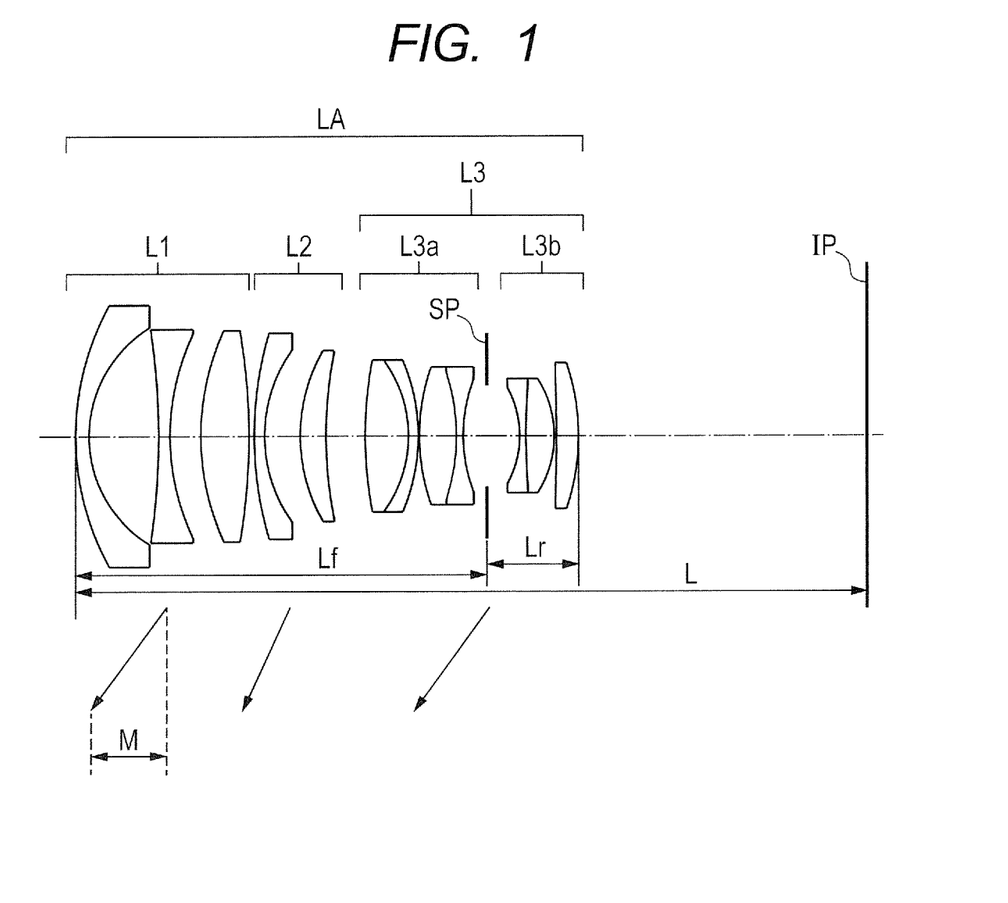
FIG. 1 is a cross-sectional view of lenses when an image pickup optical system of a first embodiment is focused at infinity.
Figure 2A:
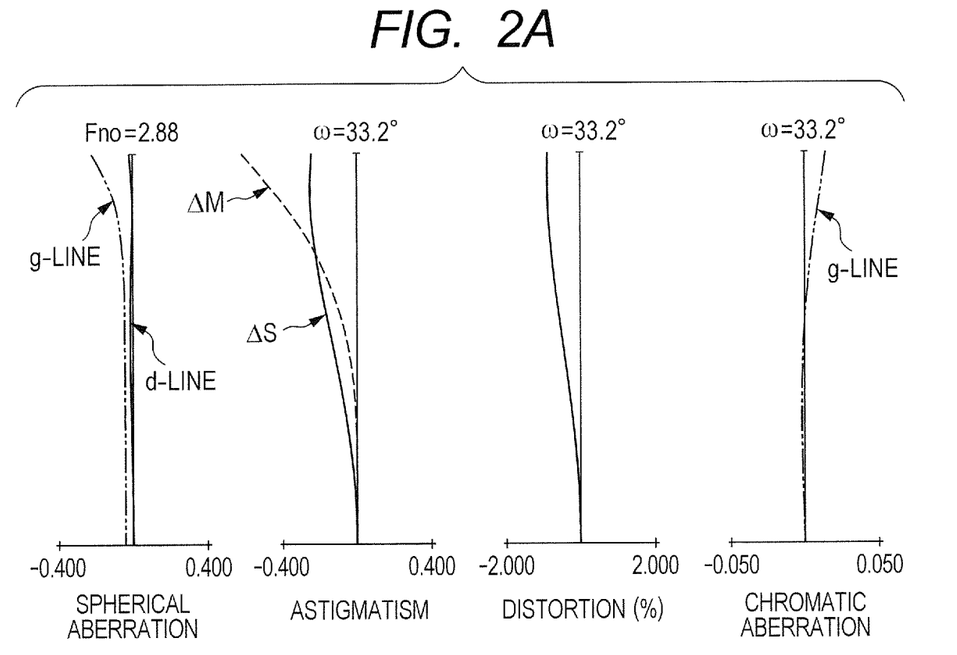
FIG. 2A is aberration diagrams when the image pickup optical system of the first embodiment is focused at infinity.
Figure 2B:
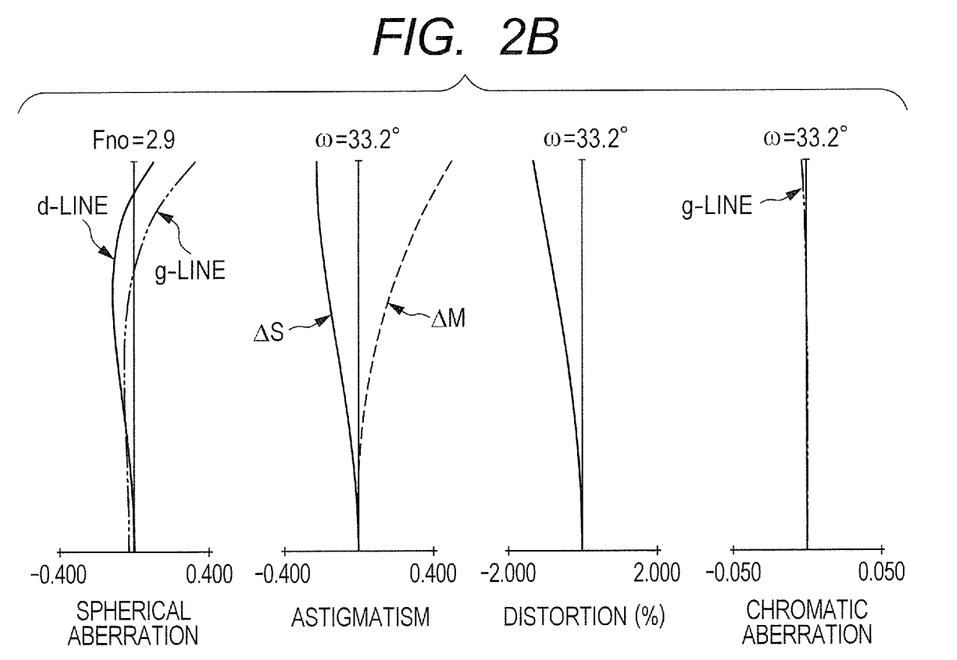
FIG. 2B is aberration diagrams when an imaging magnification of the image pickup optical system of the first embodiment is −0.5.

FIG. 1 is a cross-sectional view of lenses when an image pickup optical system according to a first embodiment of the present invention is focused at infinity. FIGS. 2A and 2B are aberration diagrams when the image pickup optical system of the first embodiment is focused at infinity and at an imaging magnification of −0.5, respectively. The image pickup optical system of the first embodiment has an aperture ratio (F number) of 2.88 and a half angle of view of about 33.20 degrees.

Figure 3:
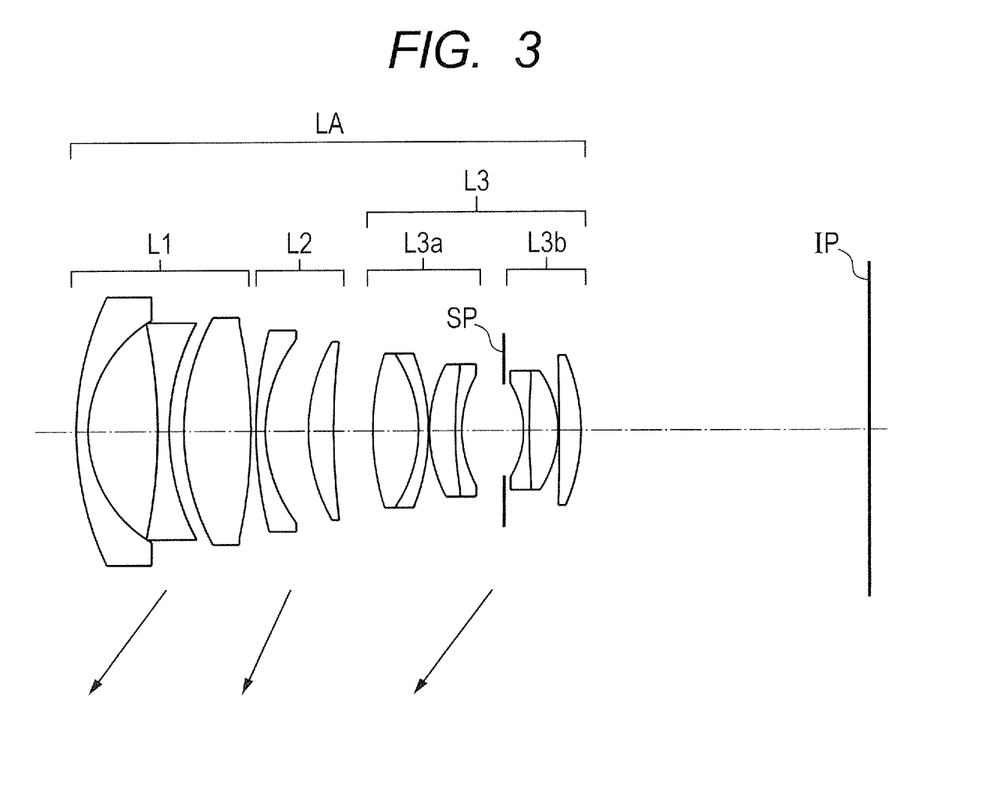
FIG. 3 is a cross-sectional view of lenses when an image pickup optical system of a second embodiment is focused at infinity.
Figure 4A:
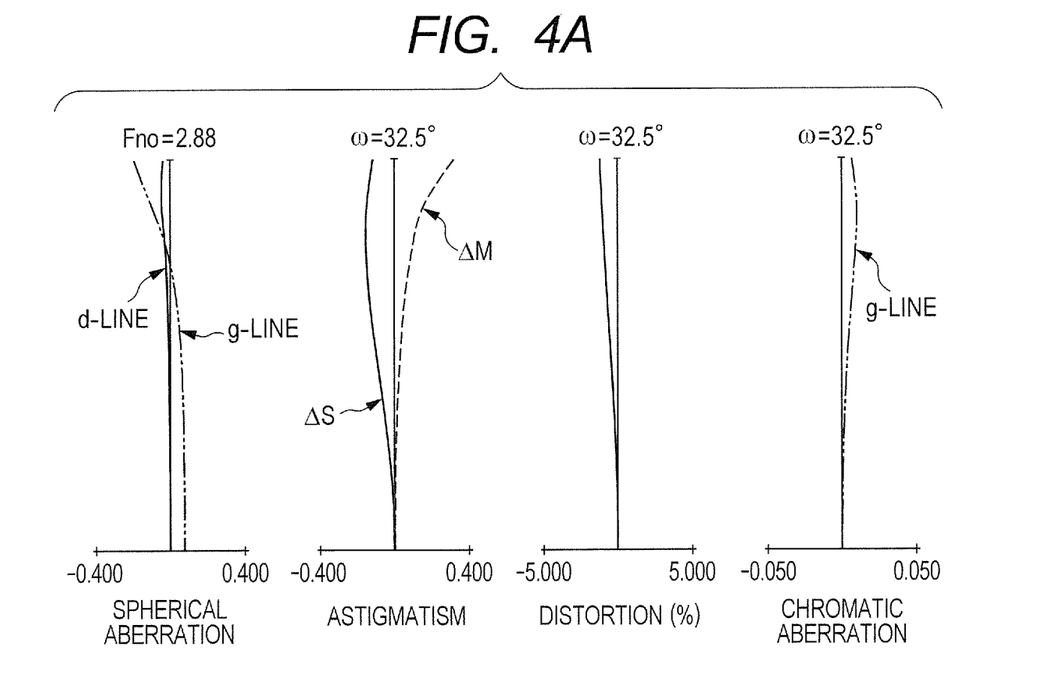
FIG. 4A is aberration diagrams when the image pickup optical system of the second embodiment is focused at infinity.
Figure 4B:
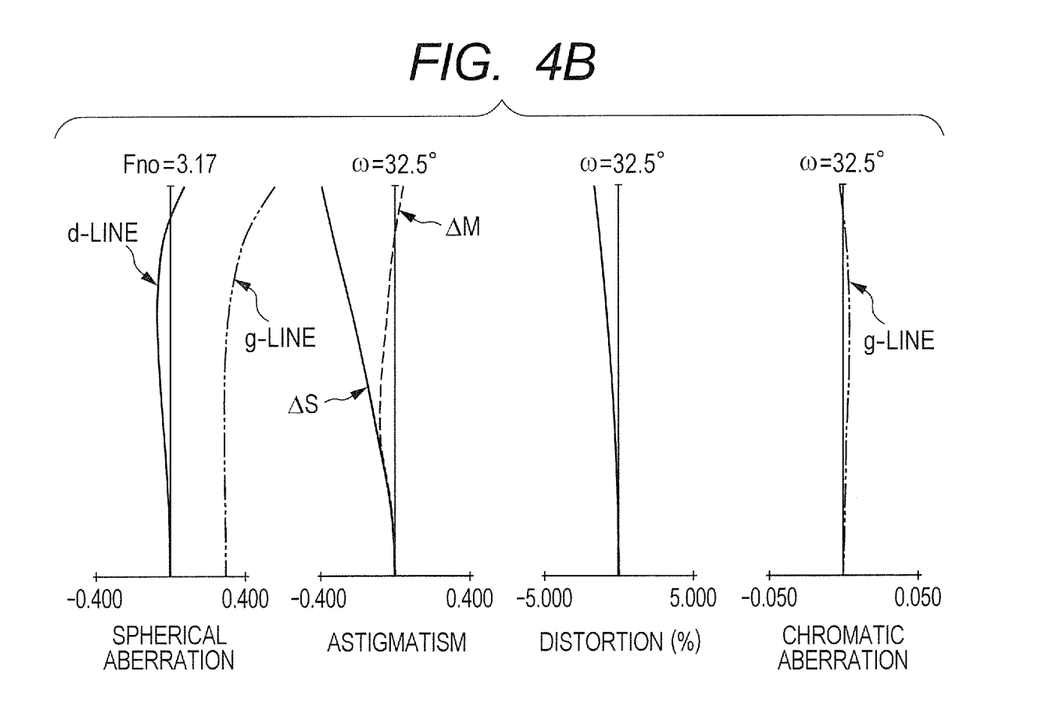
FIG. 4B is aberration diagrams when the imaging magnification of the image pickup optical system of the second embodiment is −0.7.

FIG. 3 is a cross-sectional view of lenses when an image pickup optical system according to a second embodiment of the present invention is focused at infinity. FIGS. 4A and 4B are aberration diagrams when the image pickup optical system of the second embodiment is focused at infinity and at the imaging magnification of −0.7, respectively. The image pickup optical system of the second embodiment has an aperture ratio (F number) of 2.88 and a half angle of view of about 32.49 degrees.

Figure 5:
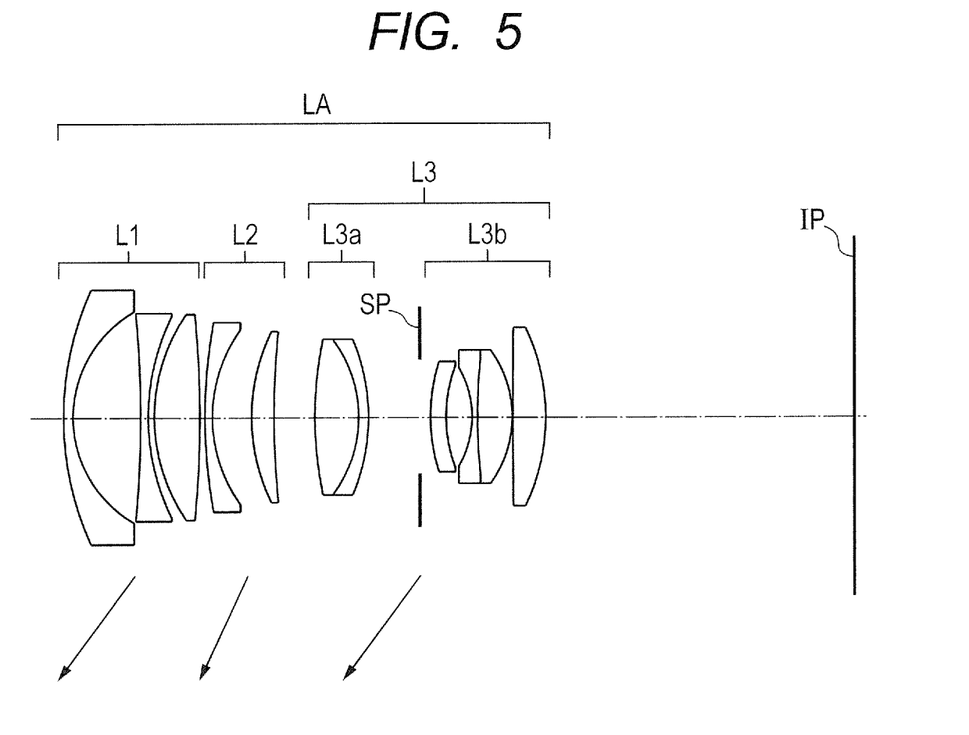
FIG. 5 is a cross-sectional view of lenses when an image pickup optical system of a third embodiment is focused at infinity.
Figure 6A:
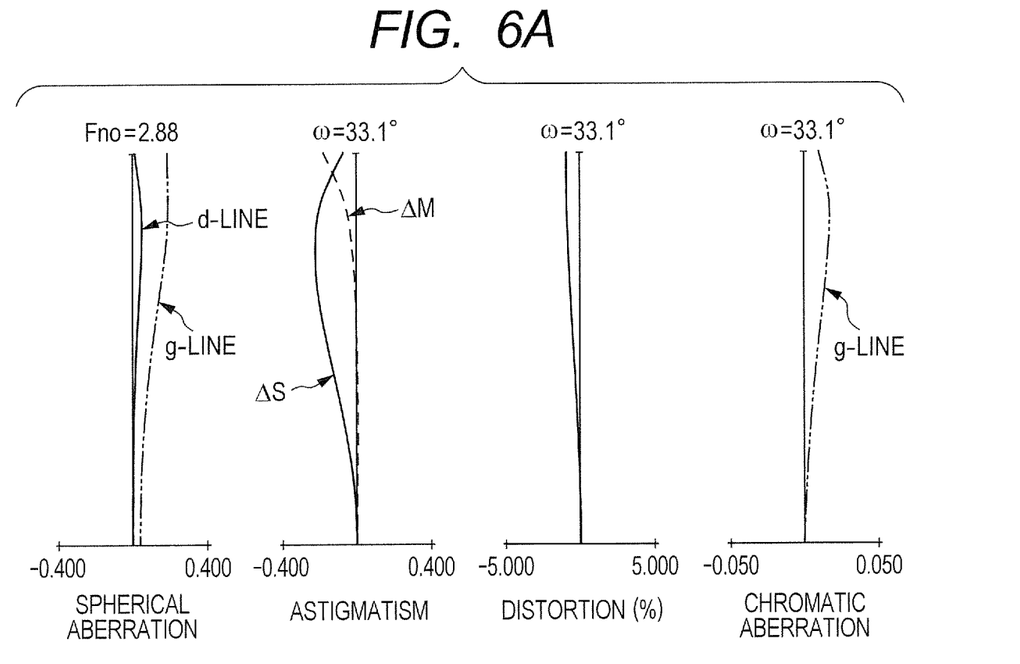
FIG. 6A is aberration diagrams when the image pickup optical system of the third embodiment is focused at infinity.
Figure 6B:
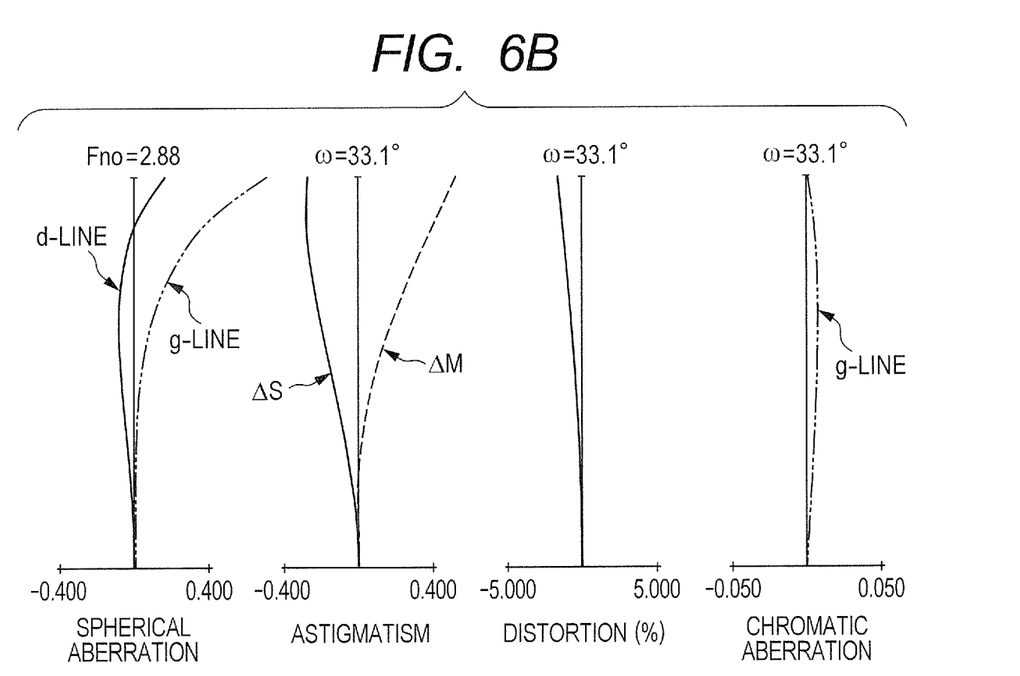
FIG. 6B is aberration diagrams when the imaging magnification of the image pickup optical system of the third embodiment is −0.7.

FIG. 5 is a cross-sectional view of lenses when an image pickup optical system according to a third embodiment of the present invention is focused at infinity. FIGS. 6A and 6B are aberration diagrams when the image pickup optical system of the third embodiment is focused at infinity and at the imaging magnification of −0.7, respectively. The image pickup optical system of the third embodiment has an aperture ratio (F number) of 2.88 and a half angle of view of about 33.07 degrees.

Figure 7:
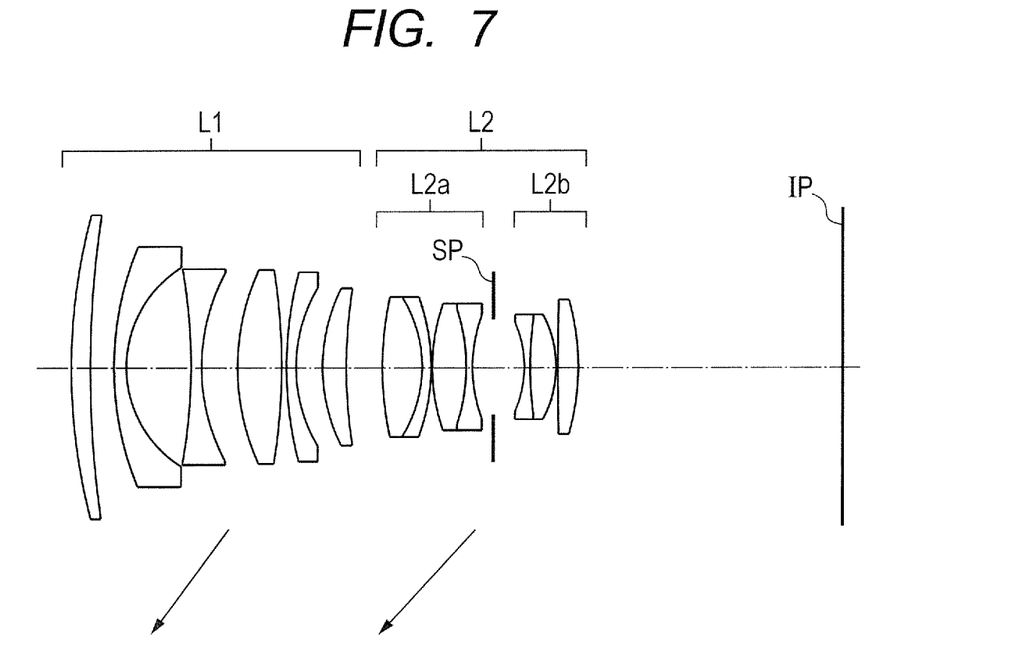
FIG. 7 is a cross-sectional view of lenses when an image pickup optical system of a fourth embodiment is focused at infinity.
Figure 8A:
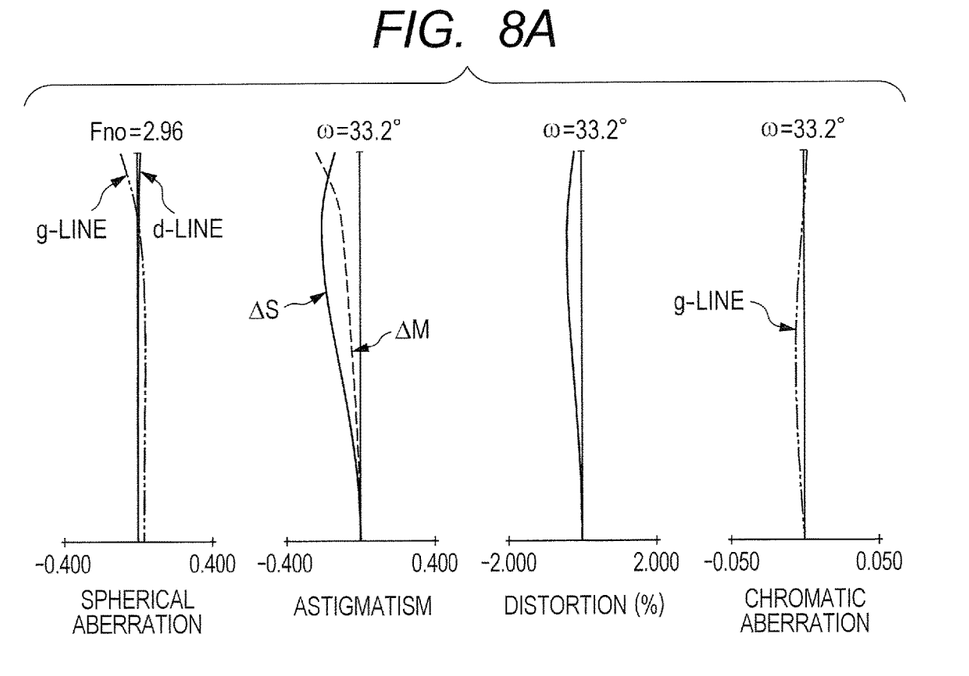
FIG. 8A is aberration diagrams when the image pickup optical system of the fourth embodiment is focused at infinity.
Figure 8B:
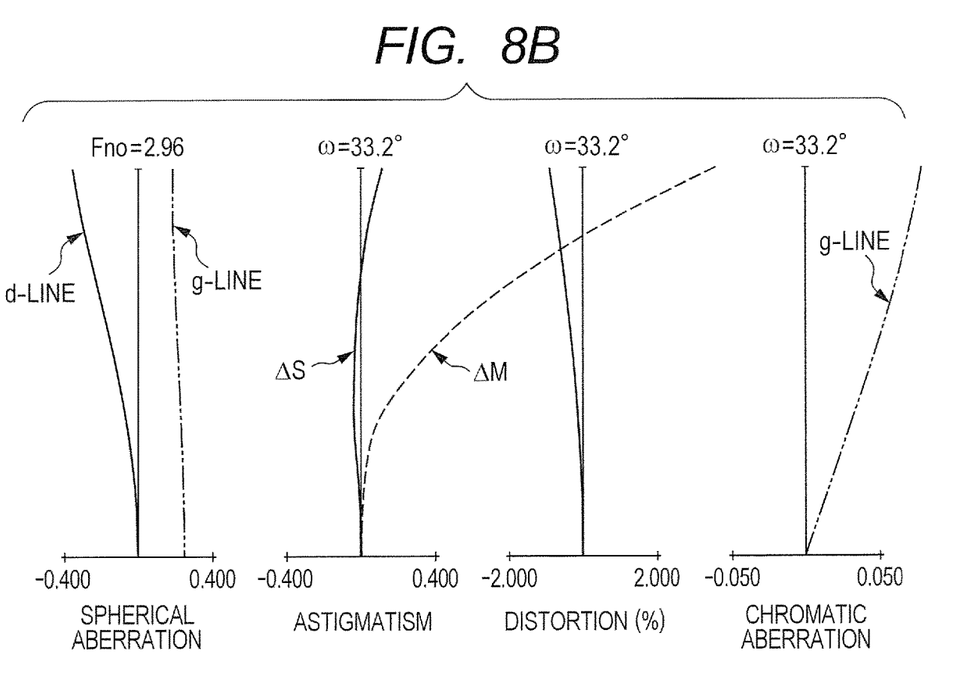
FIG. 8B is aberration diagrams when the imaging magnification of the image pickup optical system of the fourth embodiment is −1.1.

FIG. 7 is a cross-sectional view of lenses when an image pickup optical system according to a fourth embodiment of the present invention is focused at infinity. FIGS. 8A and 8B are aberration diagrams when the image pickup optical system of the fourth embodiment is focused at infinity and at the imaging magnification of −1.1, respectively. The image pickup optical system of the fourth embodiment has an aperture ratio (F number) of 2.96 and a half angle of view of about 33.2 degrees.

In the lens cross-sectional view, the left side is an object side (front side) and the right side is an image side (rear side). In addition, in the lens cross-sectional view, when "i" indicates an order of the lens unit from the object side, "Li" indicates an i-th lens unit. In the lens cross-sectional view, "LA" indicates the image pickup optical system. In cross-sectional views of lenses shown in FIGS. 1, 3 and 5, "L1" indicates the first lens unit having a negative refractive power, "L2" indicates the second lens unit having a positive refractive power, and "L3" indicates the third lens unit having a positive refractive power. Further, in a cross-sectional view of lenses shown in FIG. 7, "L1" indicates the first lens unit having a positive refractive power, "L2" indicates the second lens unit having a positive refractive power.

In cross-sectional views of lenses shown in FIGS. 1, 3 and 5, "SP" indicates an aperture stop which determines (restricts) a light flux at the time of an open F-number. The third lens unit L3 is configured by a 3a-th lens system L3a having a positive refractive power at the object side and a 3b-th lens system L3b having a positive refractive power at the image side, with the aperture stop SP as a boundary. Further, in a cross-sectional view of lenses shown in FIG. 7, the second lens unit L2 is configured by a 2a-th lens system L2a having a positive refractive power at the object side and a 2b-th lens system L2b having a positive refractive power at the image side, with the aperture stop SP as a boundary.

"IP" is an image plane. The image plane IP corresponds to an imaging plane of an image pickup element (photoelectric conversion element) such as a CCD sensor or a CMOS sensor when the image pickup optical system LA is used in the image pickup apparatus such as a digital camera or a TV camera. The image plane IP corresponds to a film surface when the image pickup optical system LA is used in an image pickup apparatus such as a silver halide camera. Each arrow indicates a moving locus of respective lens units during focusing from an object at infinity to an object at a close distance.

In the aberration diagrams, "Fno" indicates an F-number. In the spherical aberration diagram, the solid line indicates a d-line (a wave length of 587.56 nm), and the two-dot chain line indicates a g-line (a wave length of 435.8 nm). In the astigmatism diagram, the solid line ΔS indicates a sagittal image plane for d-line, and the dotted line ΔM indicates a meridional image plane for d-line. A distortion is shown with respect to d-line. In the lateral chromatic aberration diagram, the two-dot chain line indicates the g-line.

The image pickup optical system LA of the first to third embodiments is configured by the first lens unit L1 having a negative refractive power, the second lens unit L2 having a positive refractive power, and the third lens unit L3 having a positive refractive power disposed in an order from an object side to an image side. The third lens unit L3 includes the aperture stop SP. The image pickup optical system LA of the fourth embodiment is configured by the first lens unit L1 having a positive refractive power and the second lens unit L2 having a positive refractive power disposed in an order from an object side to an image side. The second lens unit L2 includes the aperture stop SP.

During focusing, the interval between the adjacent lens units is changed. A distance on an optical axis from the lens surface closest to the object side to the aperture stop SP in the image pickup optical system LA when the system is focused at infinity is represented by Lf. A distance on the optical axis from the aperture stop SP to the lens surface closest to the image side in the image pickup optical system LA when the system is focused at infinity is represented by Lr. A distance on the optical axis from the lens surface closest to an object side to the image plane when the system is focused at infinity is represented by L, a focal length of the entire system is represented by f, and a moving amount of the first lens unit L1 during focusing from infinity to the closest distance is represented by M.

In this case, the image pickup optical system LA of the present invention satisfies the following conditional expressions.

$$2.6 < Lf/Lr < 6.0 \qquad (1)$$

$$2.5 < L/f < 5.0 \qquad (2)$$

$$0.4 < |M/f| < 1.1 \qquad (3)$$

Herein, the moving amount of the lens unit means a difference between a position of the lens unit on the optical axis when the system is focused at infinity and a position of the lens unit on the optical axis when the system is focused at a close distance. A sign of the moving amount is set to be positive when the lens unit is moved to the image side, and negative when the lens unit is moved to the object side at the close distance compared to infinity. Herein, the close distance indicates a case where the imaging magnification is −0.5 in the first embodiment described below, a case where the imaging magnification is −0.7 in the second and third embodiments described below, and a case where the imaging magnification is −1.1 in the fourth embodiment described below.

The image pickup optical system LA of the present invention includes a plurality of lens units, and all the lens units move in the optical-axis direction to perform focusing. In addition, at least one lens unit moves along a locus different from that of the other lens units. Thereby, a variation in spherical aberration and in field curvature is reduced at the time of close-distance capturing. The conditional expressions (1) to (3) described above are satisfied.

Herein, the conditional expression (1) defines the arrangement of the aperture stop SP in the image pickup optical system LA. When the value exceeds the upper limit of the conditional expression (1), a distance between the lens closest to the object side and the aperture stop SP is large too much. Therefore, an effective diameter of the lens closest to the object side is increased in order to sufficiently secure a peripheral light amount when the system is focused on an object at a far distance. In addition, when the value falls below the lower limit of the conditional expression (1), the effective diameter of the lens closest to the image side is increased in order to sufficiently secure a peripheral light amount when the system is focused on an object at a close distance.

The conditional expression (2) defines a relation between the focal length of the entire system and a total lens distance (a distance from a first lens surface to the image plane). When the value exceeds the upper limit of the conditional expression (2), the number of lenses is significantly increased or the effective diameter of the lens tends to be increased in order to increase a total lens length, which is not preferable. When the value falls below the lower limit of the conditional expression (2), it becomes difficult to dispose a cam barrel on the outside of a lens holding frame to secure a feeding amount necessary for each lens unit to perform close-distance capturing.

The conditional expression (3) defines the moving amount of the first lens unit L1 during focusing. When the value exceeds the upper limit of the conditional expression (3), the moving amount of the first lens unit L1 becomes too large. Therefore, it becomes difficult to dispose a long cam barrel suitable for such the large moving amount. In addition, in a case where the cam barrel is divided into two stages to be disposed, the outer diameter of the lens becomes large, which is not preferable. When the value falls below the lower limit of the conditional expression (3), the moving amount of the first lens unit L1 is insufficient, so that it becomes difficult to secure a sufficient capturing magnification at the time of close-distance capturing. In addition, when the focusing is performed on an object at a close distance, it becomes difficult to secure a sufficient peripheral light amount without increasing the effective diameter of the lens closest to the image side.

It is preferable that a numerical range of the conditional expressions (1) to (3) be set as follows.

$$2.7 < Lf/Lr < 5.6 \qquad (1a)$$

$$2.8 < L/f < 3.2 \qquad (2a)$$

$$0.45 < |M/f| < 0.70 \qquad (3a)$$

With the settings of the respective elements as described above, it is possible to obtain the image pickup optical system which easily secures a sufficient feeding amount of the lens unit during focusing while sufficiently securing a peripheral light amount at the time of close-distance capturing.

It is more preferable that one or more of the following conditional expressions be satisfied. A focal length of the first lens unit L1 is represented by f1. A focal length of the second lens unit L2 is represented by f2. In the first to third embodiments, a focal length of the lens unit (3b-th lens system) L3b disposed at the image side than the aperture stop SP is represented by f3b. Further, in the fourth embodiment, a focal length of the lens unit (2b-th lens system) L2b disposed at the image side than the aperture stop SP is represented by f2b. An effective diameter of the lens surface closest to the object side of the first lens unit L1 is represented by G1ea. A distance (back focus) on the optical axis from the lens surface closest to the image side to the image plane when the system is focused at infinity is represented by Sk.

In addition, the image pickup optical system LA of the present invention is applicable to a lens apparatus which is detachable from the image pickup apparatus. In this case, the lens apparatus includes the image pickup optical system LA and a lens barrel which holds the image pickup optical system LA, and is attached to the image pickup apparatus through an attaching mount. The image pickup apparatus includes an image pickup element. Herein, an inner diameter of the attaching mount when the lens barrel is mounted in the image pickup apparatus is represented by Mea, and a diagonal length of an image pickup effective plane of the image pickup element is represented by "IMG".

In a case where the image pickup optical system is configured by three lens units as described in the first to third embodiments, it is preferable that one or more of the following conditional expressions be satisfied.

$$-15.0 < f1/f < -2.0 \quad (4)$$

$$0.5 < f2/f < 6.0 \quad (5)$$

$$1.2 < f3b/f < 12.0 \quad (6)$$

$$0.1 < G1ea/Lf < 0.8 \quad (7)$$

$$0.8 < Sk/f < 4.0 \quad (8)$$

$$0.08 < Lr/L < 0.16 \quad (9)$$

$$0.2 < Mea/IMG < 2.0 \quad (10)$$

In a case where the image pickup optical system is configured by two lens units as described in the fourth embodiment, it is preferable that one or more of the following conditional expressions be satisfied.

$$2.0 < f1/f < 15.0 \quad (4')$$

$$0.5 < f2/f < 6.0 \quad (5)$$

$$1.2 < f2b/f < 12.0 \quad (6')$$

$$0.1 < G1ea/Lf < 0.8 \quad (7)$$

$$0.8 < Sk/f < 4.0 \quad (8)$$

$$0.08 < Lr/L < 0.16 \quad (9)$$

$$0.2 < Mea/IMG < 2.0 \quad (10)$$

Next, technical meanings of the respective conditions expressions described above will now be described. The conditional expression (4) defines a preferable range of the focal length of the first lens unit L1 when the system is configured by three lens units as described in the first to third embodiments. When the value exceeds the upper limit of the conditional expression (4) such that a negative refractive power of the first lens unit L1 becomes too strong (an absolute value of the negative refractive power is too increased), the distortion is increased, and it is difficult to correct the distortion. When the value falls below the lower limit of the conditional expression (4), the effective diameter of the first lens unit L1 is increased, which is not preferable.

The conditional expression (4') defines a preferable range of the focal length of the first lens unit L1 when the system is configured by two lens units as described in the fourth embodiment. When the value exceeds the upper limit of the conditional expression (4') such that a positive refractive power of the first lens unit L1 becomes too weak, the effective diameter of the second lens unit L2 is increased, which is not preferable. When the value falls below the conditional expression (4'), the effective diameter of the first lens unit L1 is increased, which is not preferable.

The conditional expression (5) defines a preferable range of the focal length of the second lens unit L2. When the value exceeds the upper limit of the conditional expression (5) such that a positive refractive power of the second lens unit L2 becomes too weak, an incident height of an off-axis ray in the first lens unit L1 becomes high, and the effective diameter of the first lens unit L1 tends to be increased. When the value falls below the lower limit of the conditional expression (5) such that and a positive refractive power of the second lens unit L2 becomes too strong, a coma and a variation of the image plane generated by tilting caused by a manufacturing error of each lens are increased.

The conditional expression (6) defines a preferable range of the focal length of the lens system (3b-th lens system) L3b at the image side than the aperture stop SP. When the value exceeds the upper limit of the conditional expression (6) such that a positive refractive power of the 3b-th lens system L3b at the image side of the aperture stop SP becomes too weak, an incident angle of the off-axis ray to the image plane is increased, and much shading tends to occur. When the value falls below the lower limit of the conditional expression (6) such that a positive refractive power of the 3b-th lens system L3b at the image side of the aperture stop SP becomes too strong, the rear lens effective diameter tends to be increased.

The conditional expression (6') defines a preferable range of the focal length of the lens system (2b-th lens system) L2b at the image side than the aperture stop SP. When the value exceeds the upper limit of the conditional expression (6') such that a positive refractive power of the 2b-th lens system L2b at the image side of the aperture stop SP becomes too weak, an incident angle of the off-axis ray to the image plane is increased, and much shading tends to occur. When the value falls below the lower limit of the conditional expression (6') such that a positive refractive power of the 2b-th lens system L2b at the image side of the aperture stop SP becomes too strong, the rear lens effective diameter tends to be increased.

The conditional expression (7) defines a preferable relation of a ratio of the effective diameter of the lens surface closest to the object side to a distance on the optical axis from the lens closest to the object side to the aperture stop SP. When the value is set within the range of the conditional expression (7), it becomes easy to dispose the cam barrel necessary for realizing a high capturing magnification.

The conditional expression (8) defines a preferable relation of a ratio of the back focus to the focal length of the entire system. When the value is set within the range of the conditional expression (8), it becomes easy to correspond to a wide angle of view and a mechanism for tilting the entire lens or the like with corresponding to a lens replacement system.

The conditional expression (9) defines a preferable distance from the aperture stop SP to the lens surface closest to the image side with respect to the total lens length. When the value is set within the range of the conditional expression (9), it becomes easy to achieve a high capturing magnification while sufficiently securing a peripheral light amount at the time of close-distance capturing.

The conditional expression (10) defines a preferable relation between a diameter of the attaching mount and the effective diameter (image circle diameter) of the image pickup element when the image pickup optical system of the present invention is configured separately from the image pickup main body. When the value is set within the range of the conditional expression (10), it becomes easy to correspond to a mechanism for shifting the entire lens in a direction perpendicular to the optical axis.

Further, preferably, the numerical ranges of the conditional expressions (4) to (10) may be set as follows.

$$-13.0 < f1/f < -2.5 \quad (4a)$$

$$1.0 < f2/f < 5.5 \quad (5a)$$

$$2.0 < f3b/f < 11.0 \quad (6a)$$

$$0.20 < G1ea/Lf < 0.75 \quad (7a)$$

$$0.9 < Sk/f < 3.0 \quad (8a)$$

$$0.09 < Lr/L < 0.15 \quad (9a)$$

$$0.3 < Mea/IMG < 1.0 \quad (10a)$$

Further, preferably, the numerical ranges of the conditional expression (4') and (6') may be set as follows.

$$2.5 < f1/f < 13.0 \quad (4a')$$

$$2.0 < f2b/f < 11.0 \quad (6a')$$

Further, more preferably, the numerical ranges of the conditional expressions (4a) to (10a) may be set as follows.

$$-7.0 < f1/f < -2.8 \quad (4b)$$

$$3.0 < f2/f < 5.5 \quad (5b)$$

$$3.5 < f3b/f < 10.5 \quad (6b)$$

$$0.50 < G1ea/Lf < 0.73 \quad (7b)$$

$$1.0 < Sk/f < 1.5 \quad (8b)$$

$$0.095 < Lr/L < 0.145 \quad (9b)$$

$$0.4 < Mea/IMG < 0.6 \quad (10b)$$

However, preferably, the following conditional expression (5b') is applied in the fourth embodiment, instead of the conditional expression (5b).

$$1.5 < f2/f < 5.5 \quad (5b')$$

Further, more preferably, the numerical ranges of the conditional expression (4a') and (6a') may be set as follows.

$$2.8 < f1/f < 7.0 \quad (4b')$$

$$3.5 < f2b/f < 10.5 \quad (6b')$$

In the present invention, by specifying the respective elements as described above, the image pickup optical system which easily performs the close-distance capturing is obtained.

The image pickup optical system LA of each of the first to third embodiments is configured by the first lens unit L1 having a negative refractive power, the second lens unit L2 having a positive refractive power, and the third lens unit L3 having a positive refractive power disposed in an order from an object side to an image side. The image pickup optical system LA of the fourth embodiment is configured by the first lens unit L1 having a positive refractive power and the second lens unit L2 having a positive refractive power disposed in an order from an object side to an image side. The interval between the adjacent lens units is changed during focusing. Specifically, the focusing is performed by moving all the lens units. With such a configuration, the lens diameter is made small while shortening the total lens length.

In the first to third embodiments, the first lens unit L1 and the third lens unit L3 integrally move (on the same locus) toward the object side during focusing from infinity to a close distance. The second lens unit L2 moves toward the object side during focusing from infinity to a close distance. The moving amount of the second lens unit L2 is smaller than that of the first lens unit L1 during focusing.

In the fourth embodiment, the first lens unit L1 and the second lens unit L2 move toward the object side during focusing from infinity to a close distance. The moving amount of the second lens unit L2 is larger than that of the first lens unit L1 during focusing.

Figure 9:
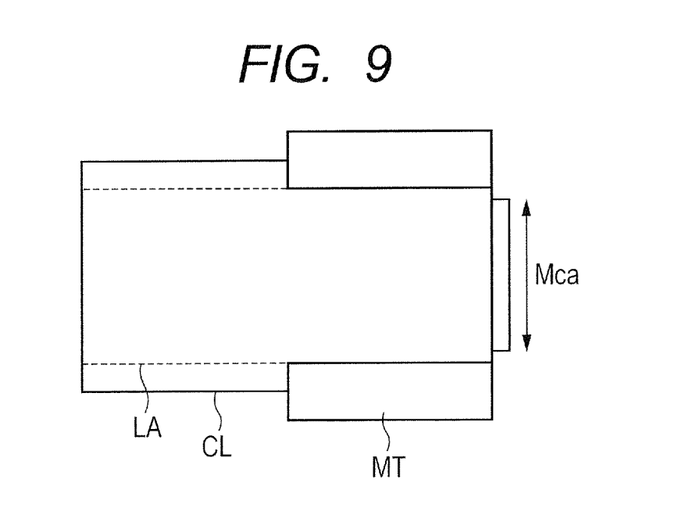
FIG. 9 is a diagram schematically illustrating main parts of a lens apparatus of the invention.

A schematic diagram of main parts of a lens apparatus L of the present invention is illustrated in FIG. 9. A driving mechanism MT includes at least one of a driving mechanism which shifts the optical axis of the image pickup optical system LA in a direction perpendicular to the optical axis and a driving mechanism which tilts the optical axis of the image pickup optical system LA. The driving mechanism may be a motor or a sliding mechanism which moves the image pickup optical system LA and a holding portion for holding the image pickup optical system LA. A lens barrel CL holds the image pickup optical system LA. The lens apparatus L comprising the image pickup optical system LA and the lens barrel CL. There is disposed a mount MT which is a portion of the lens barrel CL at the image side and serves as a contact portion when the lens apparatus L is attached to the image pickup apparatus. An inner diameter Mea of the mount MT is configured to satisfy the above-described conditional expressions (10), (10a), and (10b).

Figure 10:
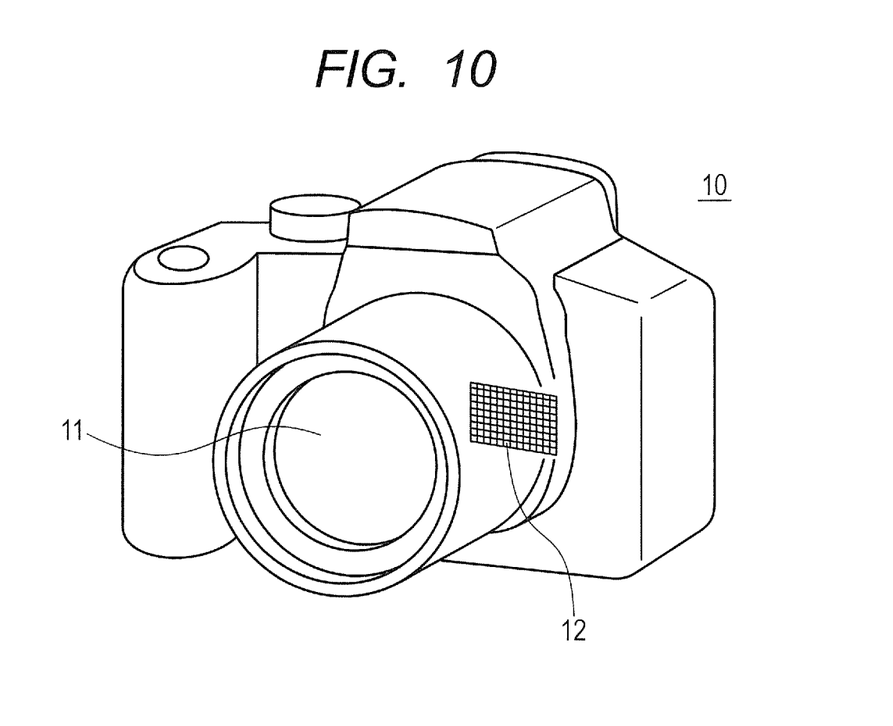
FIG. 10 is a diagram schematically illustrating main parts of an image pickup apparatus of the invention.

Next, the description will now be given using FIG. 10 about an embodiment of a digital camera (image pickup apparatus) in which the image pickup optical system of the present invention is used. In FIG. 10, there are provided a camera body 10 and an image pickup optical system 11 described in any one of the first to fourth embodiments. There is provided a solid-state image pickup element (photoelectric conversion element) 12 (for example, a CCD sensor or a CMOS sensor) which is built in the camera body and receives light of an image of an object which is formed by the image pickup optical system 11. Further, the image pickup optical systems of each embodiment may be used as a projection optical system for a projector.

Next, numerical data 1 to 4 corresponding to the first to fourth embodiments of the image pickup optical system of the present invention will be described. In the numerical data, "i" indicates a surface number counted from the object side. "ri" indicates a curvature radius of an i-th lens surface, "di" indicates a lens thickness or an air interval between the i-th lens surface and an (i+1)-th lens surface, and "ndi" and "vvdi" respectively indicate a refractive index and an Abbe number of the material of lens for the d-line between the i-th lens surface and the (i+1)-th lens surface. "Variable" in the interval means a value when an object distance (capturing magnification) is changed.

Further, the relations between the respective condition expressions described above and the first to fourth embodiments are shown in Table 1. (Stop) means a member which restricts a light flux. The focal lengths and the F numbers are also shown. The half angle of view indicates an angle of view in a tracking value of light beam. "BF" is a back focus. The total lens length is a distance from the first lens surface to the image plane when the system is focused on an object at infinity.

[Numerical Data 1]

Unit mm

Surface data

| Surface number | r | d | nd | vd | Effective diameter |
|---|---|---|---|---|---|
| 1 | 53.017 | 2.60 | 1.59270 | 35.3 | 49.60 |
| 2 | 24.876 | 13.45 | | | 40.90 |
| 3 | -140.440 | 2.20 | 1.59270 | 35.3 | 40.20 |
| 4 | 46.402 | 5.97 | | | 38.60 |
| 5 | 49.736 | 9.35 | 1.74950 | 35.3 | 39.60 |
| 6 | -124.558 | (Variable) | | | 39.80 |
| 7 | 71.410 | 2.00 | 1.65412 | 39.7 | 38.80 |
| 8 | 28.981 | 6.90 | | | 32.30 |
| 9 | 33.591 | 5.00 | 1.85478 | 24.8 | 32.00 |
| 10 | 83.690 | (Variable) | | | 31.00 |
| 11 | 79.836 | 8.40 | 1.49700 | 81.5 | 28.30 |
| 12 | -25.138 | 1.90 | 1.80000 | 29.8 | 27.80 |
| 13 | -37.507 | 0.20 | | | 28.10 |
| 14 | 40.000 | 7.20 | 1.61800 | 63.4 | 25.50 |
| 15 | -40.000 | 1.30 | 1.65412 | 39.7 | 23.50 |
| 16 | 30.497 | 4.44 | | | 20.80 |
| 17 (Stop) | ∞ | 6.53 | | | 29.80 |
| 18 | -19.525 | 1.20 | 1.95375 | 32.3 | 17.60 |
| 19 | 139.306 | 5.50 | 1.49700 | 81.5 | 18.60 |
| 20 | -20.756 | 0.40 | | | 21.00 |
| 21 | -477.536 | 4.30 | 2.00100 | 29.1 | 25.50 |
| 22 | -43.800 | 55.96 | | | 27.10 |
| Image plane | ∞ | | | | |

Various data

| | Infinity | -0.5 times |
|---|---|---|
| Focal length | 51.40 | 50.30 |
| F number | 2.88 | 4.0 |
| Half angle of view (Degree) | 33.20 | 33.20 |
| Image height | 33.63 | 33.63 |
| Total lens length | 153.42 | 178.54 |
| BF | 55.96 | 81.07 |
| d6 | 1.01 | 6.84 |
| d10 | 7.61 | 1.78 |

Lens unit data

| Unit | Start surface | Focal length |
|---|---|---|
| 1 | 1 | -341.33 |
| 2 | 7 | 271.65 |
| 3 | 11 | 84.82 |
| 3a | 11 | 82.47 |
| 3b | 17 | 260.35 |

[Numerical Data 2]

Unit mm

Surface data

| Surface number | r | d | nd | vd | Effective diameter |
|---|---|---|---|---|---|
| 1 | 60.590 | 2.30 | 1.59270 | 35.3 | 51.00 |
| 2 | 25.173 | 13.07 | | | 42.00 |
| 3 | -101.429 | 2.20 | 1.59270 | 35.3 | 41.00 |
| 4 | 44.727 | 2.99 | | | 41.00 |
| 5 | 46.270 | 13.00 | 1.74950 | 35.3 | 43.00 |
| 6 | -100.000 | (Variable) | | | 41.00 |
| 7 | 75.985 | 1.80 | 1.65412 | 39.7 | 38.00 |
| 8 | 29.614 | 8.35 | | | 34.50 |
| 9 | 35.079 | 4.90 | 1.80518 | 25.4 | 33.50 |
| 10 | 139.342 | (Variable) | | | 32.70 |
| 11 | 50.228 | 8.90 | 1.49700 | 81.5 | 28.80 |
| 12 | -26.687 | 1.90 | 1.85478 | 24.8 | 28.10 |
| 13 | -40.548 | 0.20 | | | 28.20 |
| 14 | 27.561 | 5.00 | 1.48749 | 70.2 | 24.60 |
| 15 | 74.852 | 1.30 | 1.74950 | 35.3 | 22.40 |
| 16 | 22.455 | 8.18 | | | 20.40 |
| 17 (Stop) | ∞ | 3.81 | | | 19.60 |
| 18 | -17.787 | 1.10 | 1.95375 | 32.3 | 17.10 |
| 19 | 149.117 | 5.60 | 1.49700 | 81.5 | 19.10 |
| 20 | -20.853 | 0.20 | | | 22.00 |
| 21 | -738.166 | 4.30 | 1.95375 | 32.3 | 27.40 |
| 22 | -37.145 | 56.02 | | | 28.00 |
| Image plane | ∞ | | | | |

Various data

| | Infinity | -0.7 times |
|---|---|---|
| Focal length | 51.25 | 49.32 |
| F number | 2.88 | 4.7 |
| Half angle of view (Degree) | 32.49 | 32.49 |
| Image height | 32.63 | 32.63 |
| Total lens length | 153.74 | 188.27 |
| BF | 56.02 | 90.55 |
| d6 | 1.00 | 7.61 |
| d10 | 7.61 | 1.00 |

Lens unit data

| Unit | Start surface | Focal length |
|---|---|---|
| 1 | 1 | -226.58 |
| 2 | 7 | 171.40 |
| 3 | 11 | 93.25 |
| 3a | 11 | 99.82 |
| 3b | 17 | 204.25 |

[Numerical Data 3]

Unit mm

Surface data

| Surface number | r | d | nd | vd | Effective diameter |
|---|---|---|---|---|---|
| 1 | 57.913 | 1.80 | 1.57501 | 41.5 | 46.50 |
| 2 | 22.917 | 12.60 | | | 38.30 |
| 3 | -213.186 | 1.40 | 1.60342 | 38.0 | 37.70 |
| 4 | 42.834 | 1.14 | | | 36.60 |
| 5 | 34.281 | 8.50 | 1.66998 | 39.3 | 37.30 |
| 6 | -198.193 | (Variable) | | | 36.60 |
| 7 | 98.200 | 1.40 | 1.67790 | 55.3 | 34.20 |
| 8 | 28.251 | 7.32 | | | 31.50 |
| 9 | 36.514 | 4.20 | 1.95375 | 32.3 | 30.80 |
| 10 | 161.103 | (Variable) | | | 30.10 |
| 11 | 71.427 | 8.20 | 1.49700 | 81.5 | 27.90 |
| 12 | -24.115 | 1.80 | 1.78472 | 25.7 | 27.50 |

-continued

| Unit mm | | | | | |
|---|---|---|---|---|---|
| 13 | −37.517 | 9.59 | | | 27.70 |
| 14 | ∞ | 1.99 | | | 21.30 |
| (Stop) | | | | | |
| 15 | 34.015 | 2.90 | 1.74950 | 35.3 | 19.50 |
| 16 | 26.603 | 4.87 | | | 17.80 |
| 17 | −18.440 | 1.00 | 1.95375 | 32.3 | 17.30 |
| 18 | 101.982 | 6.50 | 1.49700 | 81.5 | 19.80 |
| 19 | −21.254 | 0.15 | | | 23.70 |
| 20 | 2345.521 | 6.10 | 1.91082 | 35.3 | 30.20 |
| 21 | −39.109 | 57.68 | | | 32.10 |
| Image plane | ∞ | | | | |

Various data

| | Infinity | −0.7 times |
|---|---|---|
| Focal length | 51.65 | 49.59 |
| F number | 2.88 | 4.0 |
| Half angle of view (Degree) | 33.07 | 33.07 |
| Image height | 33.63 | 33.63 |
| Total lens length | 147.69 | 181.80 |
| BF | 57.68 | 91.79 |
| d6 | 0.94 | 6.90 |
| d10 | 7.61 | 1.65 |

Lens unit data

| Unit | Start surface | Focal length |
|---|---|---|
| 1 | 1 | −152.13 |
| 2 | 7 | 172.66 |
| 3 | 11 | 80.32 |
| 3a | 11 | 63.71 |
| 3b | 14 | 535.40 |

[Numerical Data 4]

Unit mm

Surface data

| Surface number | r | d | nd | vd | Effective diameter |
|---|---|---|---|---|---|
| 1 | 125.429 | 4.00 | 1.48749 | 70.2 | 63.00 |
| 2 | 220.105 | 5.00 | | | 62.00 |
| 3 | 66.423 | 2.60 | 1.59270 | 35.3 | 49.60 |
| 4 | 24.969 | 13.68 | | | 40.90 |
| 5 | −121.868 | 2.20 | 1.59270 | 35.3 | 40.20 |
| 6 | 42.161 | 7.58 | | | 38.60 |
| 7 | 49.133 | 9.35 | 1.74951 | 35.3 | 39.60 |
| 8 | −132.218 | 1.01 | | | 39.80 |
| 9 | 79.739 | 2.00 | 1.65412 | 39.7 | 38.80 |
| 10 | 32.861 | 5.58 | | | 32.30 |
| 11 | 37.052 | 5.00 | 1.85478 | 24.8 | 32.00 |
| 12 | 104.972 | (Variable) | | | 31.00 |
| 13 | 69.664 | 8.40 | 1.49700 | 81.5 | 28.30 |
| 14 | −27.999 | 1.90 | 1.80000 | 29.8 | 27.80 |
| 15 | −43.373 | 0.20 | | | 28.10 |
| 16 | 39.997 | 7.20 | 1.61800 | 63.4 | 25.50 |
| 17 | −39.997 | 1.30 | 1.65412 | 39.7 | 23.50 |
| 18 | 31.106 | 4.44 | | | 20.80 |
| 19 (Stop) | ∞ | 6.53 | | | 29.80 |
| 20 | −23.504 | 1.20 | 1.95375 | 32.3 | 17.60 |
| 21 | 69.428 | 5.50 | 1.49700 | 81.5 | 18.60 |
| 22 | −23.680 | 0.40 | | | 21.00 |
| 23 | 678.216 | 4.30 | 2.00100 | 29.1 | 25.50 |
| 24 | −53.182 | (Variable) | | | 27.10 |
| Image plane | ∞ | | | | |

-continued

Unit mm

Various data
Zoom ratio 1.00

| | Infinity | −1.1 times |
|---|---|---|
| Focal length | 51.40 | 50.98 |
| F number | 2.96 | 5.40 |
| Half angle of view (Degree) | 33.20 | 33.20 |
| Image height | 33.63 | 33.63 |
| Total lens length | 162.94 | 214.15 |
| BF | 55.95 | 112.14 |
| d12 | 7.61 | 2.62 |

Lens unit data

| Unit | Start surface | Focal length |
|---|---|---|
| 1 | 1 | 356.99 |
| 2 | 13 | 88.84 |

TABLE 1

| Conditional Expression | | First Embodiment | Second Embodiment | Third Embodiment | Fourth Embodiment |
|---|---|---|---|---|---|
| (1) | Lf/Lr | 4.491 | 5.512 | 3.253 | 4.967 |
| (2) | L/f | 3.004 | 3.000 | 2.888 | 3.170 |
| (3) | M/f | −0.489 | −0.485 | −0.660 | −0.996 |
| (4) or (4') | f1/f | −6.641 | −4.421 | −2.945 | 6.945 |
| (5) | f2/f | 5.285 | 3.344 | 3.343 | 1.728 |
| (6) | f3b/f | 5.065 | 3.985 | 10.366 | — |
| (6') | f2b | — | — | — | 6.124 |
| (7) | Glea/Lf | 0.616 | 0.617 | 0.664 | 0.707 |
| (8) | Sk/F | 1.089 | 1.093 | 1.117 | 1.088 |
| (9) | Lr/L | 0.116 | 0.098 | 0.144 | 0.110 |
| (10) | Mea/IMG | 0.403 | 0.416 | 0.477 | 0.477 |
| | M | −25.117 | −34.533 | −34.113 | −51.204 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-252695, filed on Dec. 27, 2016, and Japanese Patent Application No. 2017-197464, filed on Oct. 11, 2017 which are hereby incorporated by reference herein in their entirety.

What is claimed is:

1. An image pickup optical system comprising a first lens unit, a second lens unit, and a third lens unit disposed in an order from an object side to an image side, an interval between adjacent lens units being changed during focusing,
wherein the third lens unit includes an aperture stop,
wherein the first lens unit, the second lens unit and the third lens unit move toward the object side during focusing from infinity to the closest distance, and
wherein following conditional expressions are satisfied, $2.6 < Lf/Lr < 6.0$, $2.5 < L/f < 5.0$, and $0.4 < |M/f| < 1.1$, where Lf represents a distance on an optical axis from a lens surface closest to the object side to the aperture stop in the image pickup optical system when the image pickup optical system is focused at infinity, Lr represents a distance on the optical axis from the aperture stop to a lens surface closest to the image side in the image pickup optical system when the image pickup optical system is focused at infinity, L represents a distance on the optical axis from the lens surface closest to the object side to an image plane when the image pickup optical system is focused at infinity, f represents a focal length of the entire system, and M is a moving amount of the first lens unit during focusing from infinity to a closest distance.

2. The image pickup optical system according to claim 1, wherein a following conditional expression is satisfied, $$0.5 < f2/f < 6.0,$$

where f2 represents a focal length of the second lens unit.

3. The image pickup optical system according to claim 1, wherein a following conditional expression is satisfied, $$1.2 < f3b/f < 12.0,$$

where f3b represents a focal length of a lens system which is disposed at the image side than the aperture stop.

4. The image pickup optical system according to claim 1, wherein a following conditional expression is satisfied, $$0.1 < G1ea/Lf < 0.8,$$

where G1ea represents an effective diameter of the lens surface closest to the object side of the first lens unit.

5. The image pickup optical system according to claim 1, wherein a following conditional expression is satisfied, $$0.8 < Sk/f < 4.0,$$

where Sk represents a distance on the optical axis from the lens surface closest to the image side to the image plane when the image pickup optical system is focused at infinity.

6. The image pickup optical system according to claim 1, wherein a following conditional expression is satisfied, $$0.08 < Lr/L < 0.16.$$

7. The image pickup optical system according to claim 1, wherein the first lens unit has a negative refractive power, the second lens unit has a positive refractive power, and the third lens unit has a positive refractive power.

8. A lens apparatus, comprising:
the image pickup optical system according to claim 1; and
a driving mechanism which is able to shift or tilt the optical axis of the image pickup optical system.

9. An image pickup apparatus, comprising:
the image pickup optical system according to claim 1; and
an image pickup element which receives light of an image formed by the image pickup optical system.

10. An image pickup system, comprising:
the image pickup optical system according to claim 1;
a lens apparatus which includes a lens barrel to hold the image pickup optical system; and
an image pickup apparatus from which the lens apparatus is detachable,
wherein a following conditional expression is satisfied, $$0.2 < Mea/IMG < 2.0,$$

where Mea represents an inner diameter of an attaching mount when the lens barrel is mounted in the image pickup apparatus, and IMG represents a diagonal length of an image pickup effective plane of an image pickup element included in the image pickup apparatus.

11. An image pickup optical system comprising a first lens unit, a second lens unit, and a third lens unit disposed in an order from an object side to an image side, an interval between adjacent lens units being changed during focusing, wherein the third lens unit includes an aperture stop, and wherein following conditional expressions are satisfied, $$2.6 < Lf/Lr < 6.0,$$

$$2.5 < L/f < 5.0,$$

$$0.4 < |M/f| < 1.1, \text{ and}$$

$$-15.0 < f1/f < -2.0,$$

where Lf represents a distance on an optical axis from a lens surface closest to the object side to the aperture stop in the image pickup optical system when the image pickup optical system is focused at infinity, Lr represents a distance on the optical axis from the aperture stop to a lens surface closest to the image side in the image pickup optical system when the image pickup optical system is focused at infinity, L represents a distance on the optical axis from the lens surface closest to the object side to an image plane when the image pickup optical system is focused at infinity, f represents a focal length of the entire system, M is a moving amount of the first lens unit during focusing from infinity to a closest distance, and f1 represents a focal length of the first lens unit.

12. An image pickup optical system comprising a first lens unit and a second lens unit disposed in an order from an object side to an image side, an interval between adjacent lens units being changed during focusing,
wherein the second lens unit includes an aperture stop,
wherein the first lens unit and the second lens unit move toward the object side during focusing from infinity to the closest distance, and
wherein following conditional expressions are satisfied, $$2.6 < Lf/Lr < 6.0,$$

$$2.5 < L/f < 5.0, \text{ and}$$

$$0.4 < |M/f| < 1.1,$$

where Lf represents a distance on an optical axis from a lens surface closest to the object side to the aperture stop in the image pickup optical system when the image pickup optical system is focused at infinity, Lr represents a distance on the optical axis from the aperture stop to a lens surface closest to the image side in the image pickup optical system when the image pickup optical system is focused at infinity, L represents a distance on the optical axis from the lens surface closest to the object side to an image plane when the image pickup optical system is focused at infinity, f represents a focal length of the entire system, and M represents a moving amount of the first lens unit during focusing from infinity to a closest distance.

13. The image pickup optical system according to claim 12, wherein a following conditional expression is satisfied, $$2.0 < f1/f < 15.0,$$

where f1 represents a focal length of the first lens unit.

14. The image pickup optical system according to claim 12, wherein a following conditional expression is satisfied, $$0.5 < f2/f < 6.0,$$

where f2 represents a focal length of the second lens unit.

15. The image pickup optical system according to claim 12, wherein a following conditional expression is satisfied, $$1.2 < f3b/f < 12.0,$$

where f3b represents a focal length of a lens system which is disposed at the image side than the aperture stop.

16. The image pickup optical system according to claim 12, wherein a following conditional expression is satisfied, $$0.1 < G1ea/Lf < 0.8,$$

where G1ea represents an effective diameter of the lens surface closest to the object side of the first lens unit.

17. The image pickup optical system according to claim 12, wherein a following conditional expression is satisfied, $$0.8 < Sk/f < 4.0,$$

where Sk represents a distance on the optical axis from the lens surface closest to the image side to an image plane when the image pickup optical system is focused at infinity.

18. The image pickup optical system according to claim 12, wherein a following conditional expression is satisfied, $$0.08 < Lr/L < 0.16.$$

19. The image pickup optical system according to claim 12, wherein the first lens unit and the second lens unit have a positive refractive power.

20. A lens apparatus, comprising:
the image pickup optical system according to claim 12; and
a driving mechanism which is able to shift or tilt an optical axis of the image pickup optical system.

21. An image pickup apparatus, comprising:
the image pickup optical system according to claim 12; and
an image pickup element which receives light of an image formed by the image pickup optical system.

22. An image pickup system, comprising:
the image pickup optical system according to claim 12;
a lens apparatus which includes a lens barrel to hold the image pickup optical system; and
an image pickup apparatus from which the lens apparatus is detachable,
wherein a following conditional expression is satisfied, $$0.2 < Mea/IMG < 2.0,$$

where Mea represents an inner diameter of an attaching mount when the lens barrel is mounted in the image pickup apparatus, and IMG represents a diagonal length of a capturing effective plane of an image pickup element included in the image pickup apparatus.

* * * * *